(12) United States Patent
Momose et al.

(10) Patent No.: US 12,181,079 B2
(45) Date of Patent: Dec. 31, 2024

(54) HOSE FOR FLUID TRANSPORTATION

(71) Applicant: The Yokohama Rubber Co., LTD., Kanagawa (JP)

(72) Inventors: Ai Momose, Kanagawa (JP); Shun Sato, Kanagawa (JP); Aya Sato, Kanagawa (JP); Tomohiro Yonaha, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 18/700,083

(22) PCT Filed: Jun. 20, 2022

(86) PCT No.: PCT/JP2022/024606
§ 371 (c)(1),
(2) Date: Apr. 10, 2024

(87) PCT Pub. No.: WO2023/062879
PCT Pub. Date: Apr. 20, 2023

(65) Prior Publication Data
US 2024/0328545 A1    Oct. 3, 2024

(30) Foreign Application Priority Data
Oct. 15, 2021   (JP) ................... 2021-169689

(51) Int. Cl.
*F16L 11/08* (2006.01)

(52) U.S. Cl.
CPC .......... *F16L 11/083* (2013.01); *F16L 11/085* (2013.01)

(58) Field of Classification Search
CPC ..................... F16L 11/083; F16L 11/085
See application file for complete search history.

(56) References Cited

FOREIGN PATENT DOCUMENTS

| JP | 4-145284 A | 5/1992 |
| JP | 2012-92959 A | 5/2012 |
| JP | 2015-520264 A | 7/2015 |
| JP | 2019-73025 A | 5/2019 |
| JP | 2020-139051 A | 9/2020 |
| JP | 2021-120584 A | 8/2021 |

*Primary Examiner* — David R Deal
(74) *Attorney, Agent, or Firm* — Thorpe North & Western

(57) ABSTRACT

A hose for fluid transportation includes an inner layer, a reinforcing layer, and an outer layer. The inner layer includes a (A) layer including a thermoplastic resin composition ax made of a matrix am containing a thermoplastic resin ar and a domain ad containing a rubber ae, a (B) layer including a thermoplastic resin b or a thermoplastic resin composition bx made of a matrix bm containing a thermoplastic resin br and a domain bd containing a rubber be, and a (C) layer including a rubber composition cx. The (A), (B) and (C) layers are arranged in this order as innermost to outer layers. A 10% modulus M10 to 100% modulus M100 ratio of the (A) and (B) layer structure satisfies $0.5<M10/M100<1.2$. A 100% modulus of the (C) layer<a 100% modulus of the (A) layer<a 100% modulus of the (B) layer.

18 Claims, 1 Drawing Sheet

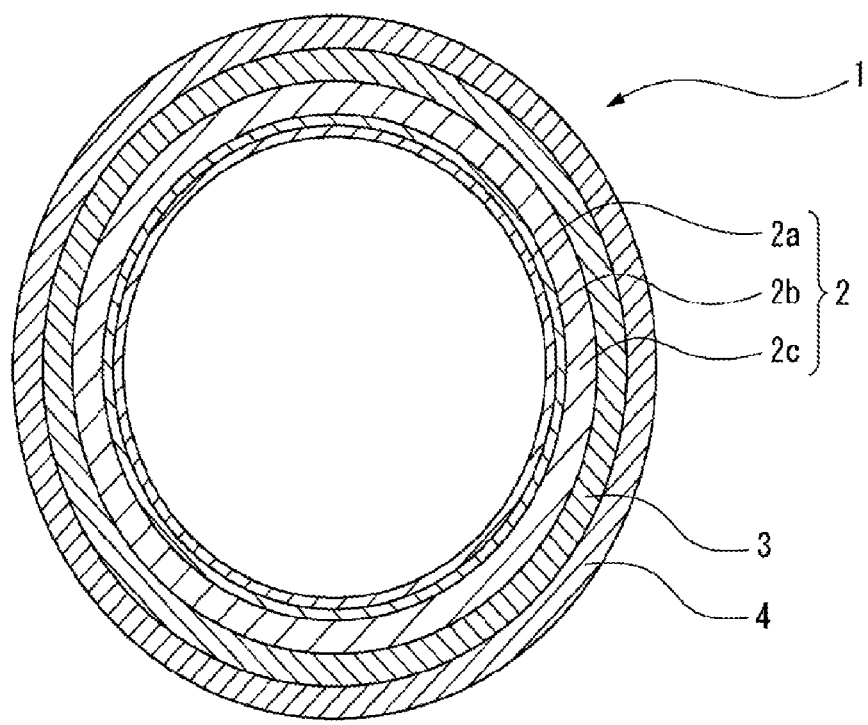

HOSE FOR FLUID TRANSPORTATION

TECHNICAL FIELD

The present technology relates to a hose for fluid transportation. More particularly, the present technology relates to a hose used to transport fluids such as gasoline and fuel.

BACKGROUND ART

Known hoses for fluid transportation include a multilayer tube having a layer of an aliphatic polyamide composition and a layer of a saponified ethylene/vinyl acetate copolymer composition (see Japan Unexamined Patent Publication No. 2019-73025 A).

The multilayer tube has excellent chemical resistance, interlayer adhesiveness, and durability while maintaining various characteristics such as chemical liquid barrier properties, low-temperature shock resistance, and elution resistance to monomers and oligomers.

SUMMARY

Hoses for fluid transportation are required to be flexible from the perspective of handling properties. Meanwhile, it is desired that the hoses be less likely to collapse and close up when bent at a small curvature, in other words, be less likely to kink.

The present technology provides a hose for fluid transportation that has excellent kink resistance while being flexible.

The present inventors found that sandwiching a layer of a thermoplastic resin having excellent barrier properties between a layer of a thermoplastic resin composition, made of a thermoplastic resin matrix and a rubber domain, and a layer of a rubber composition can result in a hose having excellent kink resistance while maintaining the barrier properties of the thermoplastic resin.

The present technology is a hose for fluid transportation including an inner layer, a reinforcing layer, and an outer layer, the inner layer including a (A) layer including a thermoplastic resin composition ax made of a matrix am containing a thermoplastic resin ar and a domain ad containing a rubber ae, a (B) layer including a thermoplastic resin b or a thermoplastic resin composition bx made of a matrix bm containing a thermoplastic resin br and a domain bd containing a rubber be, and a (C) layer including a rubber composition cx.

the (A) layer being an innermost layer, the (B) layer being arranged on an outer side of the (A) layer, and the (C) layer being arranged on an outer side of the (B) layer, a ratio M10 (AB)/M100 (AB) of a 10% modulus M10 (AB) to a 100% modulus M100 (AB) of a multilayer structure including the (A) layer and the (B) layer being more than 0.5 and less than 1.2, and a 100% modulus M100 (A) of the (A) layer, a 100% modulus M100 (B) of the (B) layer, and a 100% modulus M100 (C) of the (C) layer satisfying the relationship formula M100 (C)<M100 (A)<M100 (B).

The present technology includes the following embodiments.

[1] A hose for fluid transportation including an inner layer, a reinforcing layer, and an outer layer, the inner layer including a (A) layer including a thermoplastic resin composition ax made of a matrix am containing a thermoplastic resin ar and a domain ad containing a rubber ae, a (B) layer including a thermoplastic resin b or a thermoplastic resin composition bx made of a matrix bm containing a thermoplastic resin br and a domain bd containing a rubber be, and a (C) layer including a rubber composition cx.

the (A) layer being an innermost layer, the (B) layer being arranged on an outer side of the (A) layer, and the (C) layer being arranged on an outer side of the (B) layer, a ratio M10 (AB)/M100 (AB) of a 10% modulus M10 (AB) to a 100% modulus M100 (AB) of a multilayer structure including the (A) layer and the (B) layer being more than 0.5 and less than 1.2, and a 100% modulus M100 (A) of the (A) layer, a 100% modulus M100 (B) of the (B) layer, and a 100% modulus M100 (C) of the (C) layer satisfying the relationship formula M100 (C)<M100 (A)<M100 (B).

[2] The hose for fluid transportation according to [1], wherein the (A) layer and the (B) layer are directly bonded to each other or bonded to each other via an adhesive layer.

[3] The hose for fluid transportation according to [1] or [2], wherein a ratio T (AB)/T (C) of a total thickness T (AB) of the (A) layer and the (B) layer to a thickness T (C) of the (C) layer is from 0.01 to 2.0.

[4] The hose for fluid transportation according to any one of [1] to [3], wherein a ratio T (A)/T (B) of a thickness T (A) of the (A) layer and a thickness T (B) of the (B) layer is more than 0.1 and less than 20, and the thickness T (B) of the (B) layer is from 0.01 to 0.5 mm.

[5] The hose for fluid transportation according to any one of [1] to [4], wherein the thermoplastic resin composition ax contains from 5 to 70 mass % of the domain ad.

[6] The hose for fluid transportation according to any one of [1] to [5], wherein the thermoplastic resin composition ax contains 0.1 mass % or more of a compound having plasticizing action.

[7] The hose for fluid transportation according to any one of [1] to [6], wherein the thermoplastic resin b or the thermoplastic resin br contains at least one selected from the group consisting of an ethylene-vinyl alcohol copolymer, polyamide 6, a polyamide 6/66 copolymer, polyamide 66, polyamide 610, a polyamide 6/12 copolymer, polyamide 1010, polyamide 11, and polyamide 12.

[8] The hose for fluid transportation according to any one of [1] to [7], wherein 50 mass % or more of rubber in the rubber composition cx is at least one selected from the group consisting of acrylonitrile-butadiene rubber, acrylic rubber, and fluororubber.

[9] The hose for fluid transportation according to any one of [1] to [8], wherein a fuel transmission of the (B) layer at 23° C. is 2.0 mm·mg/24 h·cm$^2$ or less.

[10] The hose for fluid transportation according to any one of [1] to [9], wherein the fluid is gasoline, alcohol-mixed gasoline, kerosene, light oil, heavy oil, vegetable oil, an organic solvent, or a mixture of the foregoing.

The hose for fluid transportation according to an embodiment of the present technology has excellent kink resistance while being flexible.

BRIEF DESCRIPTION OF THE DRAWING

The Drawing is a cross-sectional view of a hose for fluid transportation of the present technology.

DETAILED DESCRIPTION

The present technology relates to a hose for fluid transportation.

The fluid to be transported is preferably, but not limited to, liquid fuel.

Examples of the liquid fuel include gasoline, alcohol-mixed gasoline, kerosene, light oil, heavy oil, vegetable oil, an organic solvent, or a mixture of the foregoing.

The Drawing is a cross-sectional view of a hose for fluid transportation according to an embodiment of the present technology. However, the hose for fluid transportation according to an embodiment of the present technology is not limited to what is illustrated in the Drawing.

A hose for fluid transportation 1 according to an embodiment of the present technology includes an inner layer 2, a reinforcing layer 3, and an outer layer 4, with the inner layer including a (A) layer 2a, a (B) layer 2b, and a (C) layer 2c.

The (A) layer includes a thermoplastic resin composition ax made of a matrix am containing a thermoplastic resin ar and a domain ad containing a rubber ae.

The (B) layer includes a thermoplastic resin b or a thermoplastic resin composition bx. The thermoplastic resin composition bx is made of a matrix bm containing a thermoplastic resin br and a domain bd containing a rubber be.

The (C) layer includes a rubber composition cx.

A ratio M10 (AB)/M100 (AB) of a 10% modulus M10 (AB) to a 100% modulus M100 (AB) of a multilayer structure including the (A) layer and the (B) layer is more than 0.5 and less than 1.2, preferably more than 0.7 and less than 1.1, and more preferably more than 0.9 and less than 1.1.

Setting M10 (AB)/M100 (AB) to within the above numerical ranges can result in a hose having kink resistance.

To set M10 (AB)/M100 (AB) to within the above numerical ranges, it is preferable that the A layer is made of a material more ductile than that of the B layer, and that the A layer and the B layer are bonded to each other.

The 10% modulus and 100% modulus of the multilayer structure are measured in accordance with JIS (Japanese Industrial Standard) K6301 "Physical Testing Method for Vulcanized Rubber".

A 100% modulus M100 (A) of the (A) layer, a 100% modulus M100 (B) of the (B) layer, and a 100% modulus M100 (C) of the (C) layer need to satisfy the relationship formula M100 (C)<M100 (A)<M100 (B). In other words, it is necessary that the 100% modulus M100 (A) of the (A) layer is smaller than the 100% modulus M100 (B) of the (B) layer and larger than the 100% modulus M100 (C) of the (C) layer.

Satisfying the relationship formula above makes it easy to provide both kink resistance and flexibility in a compatible manner.

The 100% moduli of the (A) layer and the (B) layer are measured in accordance with JIS K6301 "Physical Testing Method for Vulcanized Rubber", and the 100% modulus of the (C) layer is measured in accordance with JIS K6301 "Physical Testing Method for Vulcanized Rubber".

The (A) layer 2a is the innermost layer, the (B) layer 2b is arranged on the outer side of the (A) layer 2a, and the (C) layer 2c is arranged on the outer side of the (B) layer 2b.

Since the (B) layer 2b is sandwiched between the (A) layer 2a and the (C) layer 2c, kinks can be suppressed while the barrier properties of the (B) layer is maintained.

A ratio T (AB)/T (C) of a total thickness T (AB) of the (A) layer and the (B) layer to a thickness T (C) of the (C) layer is preferably from 0.01 to 2.0, more preferably from 0.05 to 1.5, and still more preferably from 0.05 to 1.0.

Setting T (AB)/T (C) to within the above numerical range makes it easy to achieve the desired kink resistance.

A ratio T (A)/T (B) of a thickness T (A) of the (A) layer and a thickness T (B) of the (B) layer is preferably more than 0.1 and less than 20, more preferably more than 0.5 and less than 10, and still more preferably more than 1.0 and less than 5.0.

Setting T (A)/T (B) to within the above numerical ranges makes it easy to provide the barrier properties that suppress leakage of the fluid to be transported and the ductility of the multilayer structure including the A layer and the B layer in a compatible manner.

The thickness T (B) of the (B) layer is preferably from 0.01 to 0.5 mm, more preferably from 0.05 to 0.3 mm, and still more preferably from 0.05 to 0.2 mm.

Setting the thickness T (B) of the (B) layer to within the above numerical ranges alleviates the yield point derived from the B layer.

The thickness T (A) of the (A) layer is not limited as long as T (AB)/T (C), T (A)/T (B), and T (B) are within the above numerical ranges, but is preferably from 0.5 to 0.01 mm, more preferably from 0.4 to 0.05 mm, and still more preferably from 0.3 to 0.1 mm.

The thickness T (C) of the (C) layer is not limited as long as T (AB)/T (C), T (A)/T (B), and T (B) are within the above numerical ranges, but is preferably from 0.1 to 5.0 mm, more preferably from 0.5 to 4.0 mm, and still more preferably from 1.0 to 3.0 mm.

The thermoplastic resin composition ax constituting the (A) layer is made of the matrix am containing the thermoplastic resin ar and the domain ad containing the rubber ae. In other words, the thermoplastic resin composition ax has a so-called sea-island structure.

The thermoplastic resin ar is not limited as long as M10 (AB)/M100 (AB) is within the above numerical ranges and the relationship formula M100 (C)<M100 (A)<M100 (B) is satisfied, but is preferably an ethylene-vinyl alcohol copolymer, polyamide 6, a polyamide 6/66 copolymer, polyamide 66, polyamide 610, a polyamide 6/12 copolymer, polyamide 1010, polyamide 11, and polyamide 12, and particularly preferably polyamide 6, a polyamide 6/12 copolymer, polyamide 11, polyamide 12, and an ethylene-vinyl alcohol copolymer (hereinafter also referred to as "EVOH").

The matrix am may contain various additives as long as the effects of the present technology are not inhibited.

The rubber ae is not limited as long as M10 (AB)/M100 (AB) is within the above numerical ranges and the relationship formula M100 (C)<M100 (A)<M100 (B) is satisfied, but is preferably an olefin thermoplastic elastomer, a styrene thermoplastic elastomer, a polyester thermoplastic elastomer, a polyamide thermoplastic elastomer, a polyurethane thermoplastic elastomer, and acid-modified products of these thermoplastic elastomers, and a diene rubber such as natural rubber (NR), isoprene rubber (IR), butadiene rubber (BR), 1,2-butadiene rubber, styrene-butadiene rubber (SBR), chloroprene rubber (CR), butyl rubber (IIR), acrylonitrile-butadiene rubber (NBR), halogenated butyl rubber, brominated isobutylene-p-methylstyrene copolymer, styrene-isobutylene-styrene block copolymer, acrylic rubber (ACM), fluororubber, ethylene-propylene-diene rubber (EPDM), and particularly preferably maleic acid anhydride-modified ethylene-1-butene copolymer and brominated isobutylene-p-methylstyrene copolymer (hereinafter also referred to as "Br-IPMS").

The domain ad may contain various additives as long as the effects of the present technology are not inhibited.

The thermoplastic resin composition ax preferably contains from 30 to 95 mass % of the matrix am, more preferably contains from 30 to 90 mass % of the matrix am, and still more preferably contains from 30 to 85 mass % of the matrix am.

The thermoplastic resin composition ax preferably contains from 5 to 70 mass % of the domain ad, more preferably from 10 to 70 mass % of the domain ad, and still more preferably from 15 to 70 mass % of the domain ad.

Setting the proportion of the domain ad in the thermoplastic resin composition ax to within the above numerical ranges makes it easy to balance barrier properties, flexibility, reduction in volume expansion due to the transported fluid, and the like.

The thermoplastic resin composition ax preferably contains 0.1 mass % or more of a compound having plasticizing action, more preferably from 0.1 to 5.0 mass % of a compound having plasticizing action, and still more preferably from 0.3 to 5.0 mass % of a compound having plasticizing action.

When the thermoplastic resin composition ax contains a compound having plasticizing action, the A layer becomes a ductile material. As such, when the A layer forms a multi-layer structure with the B layer, the brittle behavior (for example, yield point) of the B layer can be mitigated, making it easy to provide flexibility and kink resistance in a compatible manner.

The compound having plasticizing action may be any compound as long as it can plasticize the thermoplastic resin ar, and may be, for example, a residue of a monomer used in the polymerization of the thermoplastic resin ar or a low-molecular-weight compound which dissolves in the resin and increases molecular mobility.

Specific examples of the compound having plasticizing action include dioctyl phthalate (DOP), diisononyl phthalate (DINP), diisodecyl phthalate (DIDP), dibutyl phthalate (DBP), dioctyl adipate (DOA), diisononyl adipate (DIDA), tricresyl phosphate, isodecyl succinate, diethylene glycol dibenzoate, pentaerythritol ester, butyl oleate, acetyl ricinoleate, propylene glycol adipate polyester, butylene glycol adipate polyester, naphthenic oil, glyceryl triacetate, and N-butylbenzenesulfonamide.

Note that, in Tables 4 to 6, "compound having plasticizing action" is abbreviated as "plasticizer".

The thermoplastic resin composition ax may contain a component in addition to the thermoplastic resin ar, the rubber ae, and the compound having plasticizing action as long as the effects of the present technology are not inhibited.

The (B) layer includes the thermoplastic resin b or the thermoplastic resin composition bx.

The thermoplastic resin b is preferably a resin having high barrier properties. The thermoplastic resin b preferably contains at least one selected from the group consisting of an ethylene-vinyl alcohol copolymer, polyamide 6, a polyamide 6/66 copolymer, polyamide 66, polyamide 610, a polyamide 6/12 copolymer, polyamide 1010, polyamide 11, and polyamide 12.

When the (B) layer includes the thermoplastic resin b, the (B) layer may contain components other than the thermoplastic resin b, such as various additives, as long as the effects of the present technology are not inhibited.

The thermoplastic resin composition bx constituting the (B) layer is made of the matrix bm containing the thermoplastic resin br and the domain bd containing the rubber be. In other words, the thermoplastic resin composition bx has a so-called sea-island structure.

The thermoplastic resin br is preferably a resin having high barrier properties. The thermoplastic resin br preferably contains at least one selected from the group consisting of an ethylene-vinyl alcohol copolymer, polyamide 6, a polyamide 6/66 copolymer, polyamide 66, polyamide 610, a polyamide 6/12 copolymer, polyamide 1010, polyamide 11, and polyamide 12.

The matrix bm may contain various additives as long as the effects of the present technology are not inhibited.

The rubber be is not limited as long as M10 (AB)/M100 (AB) is within the above numerical ranges and the relationship formula M100 (C)<M100 (A)<M100 (B) is satisfied, but is preferably an olefin thermoplastic elastomer, a styrene thermoplastic elastomer, a polyester thermoplastic elastomer, a polyamide thermoplastic elastomer, a polyurethane thermoplastic elastomer, and acid-modified products of these thermoplastic elastomers, and a diene rubber such as natural rubber (NR), isoprene rubber (IR), butadiene rubber (BR), 1,2-butadiene rubber, styrene-butadiene rubber (SBR), chloroprene rubber (CR), butyl rubber (IIR), acrylonitrile-butadiene rubber (NBR), halogenated butyl rubber, brominated isobutylene-p-methylstyrene copolymer, styrene-isobutylene-styrene block copolymer, acrylic rubber (ACM), fluororubber, ethylene-propylene-diene rubber (EPDM), and particularly preferably maleic acid anhydride-modified ethylene-1-butene copolymer.

The domain bd may contain various additives as long as the effects of the present technology are not inhibited.

The thermoplastic resin composition bx may contain a component in addition to the thermoplastic resin br and the rubber be as long as the effects of the present technology are not inhibited.

The thermoplastic resin composition bx preferably contains from 30 to 95 mass % of the matrix bm, more preferably contains from 30 to 90 mass % of the matrix bm, and still more preferably contains from 30 to 85 mass % of the matrix bm.

The thermoplastic resin composition bx preferably contains from 5 to 70 mass % of the domain bd, more preferably from 10 to 70 mass % of the domain bd, and still more preferably from 15 to 70 mass % of the domain bd.

Setting the proportion of the domain bd in the thermoplastic resin composition bx to within the above numerical ranges makes it easy to provide the barrier properties that suppress leakage of the fluid to be transported and flexibility in a compatible manner.

A fuel transmission of the (B) layer at 23° C. is preferably 2.0 mm·mg/24 h cm$^2$ or less, more preferably 1.5 mm mg/24 h cm$^2$ or less, and even more preferably 1.0 mm mg/24 h cm$^2$ or less.

Setting the fuel transmission of the (B) layer at 23° C. to within the above numerical ranges can result in a hose with low fuel transmission.

The fuel transmission is measured by a method described below.

The (C) layer includes the rubber composition cx.

The rubber composition cx includes a rubber ce.

Examples of the rubber ce include diene rubbers such as natural rubber (NR), isoprene rubber (IR), butadiene rubber (BR), 1,2-butadiene rubber, styrene-butadiene rubber (SBR), chloroprene rubber (CR), butyl rubber (TIR), acrylonitrile-butadiene rubber (NBR), acrylic rubber (ACM), fluororubber, and ethylene-propylene-diene rubber (EPDM), of which acrylonitrile-butadiene rubber (NBR), acrylic rubber (ACM), and fluororubber are preferred.

Preferably, 50 mass % or more of the rubber in the rubber composition cx is at least one selected from the group consisting of acrylonitrile-butadiene rubber, acrylic rubber, and fluororubber.

The rubber composition cx contains various additives in addition to the rubber. Examples of the additives include a cross-linking agent, an anti-aging agent, a plasticizer, a processing aid, a cross-linking accelerator aid, a cross-linking accelerator, a reinforcing agent (filler), an antiscorching agent, a peptizing agent, an organic modifier, a softener, and a tackifier.

The (A) layer and the (B) layer may be bonded to each other directly or via an adhesive layer.

In the case of bonding via an adhesive layer, examples of a material constituting the adhesive layer include a phenol resin-based adhesive, a melamine resin-based adhesive, a urethane resin-based adhesive, and an epoxy resin-based adhesive, of which a urethane resin-based adhesive and a phenol resin-based adhesive are preferable.

The thickness of the adhesive layer is not limited as long as sufficient adhesive strength is achieved, but is preferably from 0.5 to 10 µm, more preferably from 0.5 to 5.0 µm, and still more preferably from 0.5 to 3.0 µm.

The method for forming the adhesive layer is not limited, but the adhesive layer can be provided by applying or spraying an adhesive solution to the outer side of the A layer or coating the outer side of the A layer with an adhesive solution.

By bonding via the adhesive layer, the A layer and the B layer are less likely to separate when the hose deforms repeatedly, which is advantageous for durability.

The reinforcing layer is usually composed of a braided layer or a spiral layer formed by braiding metal wires or organic fibers. Examples of the metal wire include steel wires, wires of copper or a copper alloy, wires of aluminum or an aluminum alloy, wires of a magnesium alloy, and wires of titanium or a titanium alloy, and a steel wire is preferred. The wire diameter of the metal wire is preferably from 0.25 to 0.40 mm. Examples of the organic fiber include polyparaphenylene benzobisoxazole (PBO) fibers, aramid fibers, and carbon fibers, and a PBO fiber is preferable. The strand diameter of the organic fiber is preferably from 0.25 to 0.30 mm.

The reinforcing layer may be two or more layers of the braided layer or the spiral layer, or may be a combination of the braided layer and the spiral layer.

The outer layer is usually composed of a rubber composition, a thermoplastic elastomer, or a thermoplastic elastomer composition.

Examples of the rubber composition include, but are not limited to, those produced by adding an additive to a rubber. Examples of the additive include a cross-linking agent, an anti-aging agent, a plasticizer, a processing aid, a cross-linking accelerator aid, a cross-linking accelerator, a reinforcing agent (filler), an antiscorching agent, a peptizing agent, an organic modifier, a softener, and a tackifier, and examples of the rubber include acrylonitrile-butadiene rubber (NBR), acrylonitrile-butadiene rubber (NBR)/polyvinyl chloride (PVC) blend, chlorosulfonated polyethylene (CSM), and butyl rubber (IIR).

Examples of the thermoplastic elastomer include an olefin-based thermoplastic elastomer, a styrene-based thermoplastic elastomer, a polyamide elastomer, a polyester elastomer, and a polyurethane elastomer.

Examples of thermoplastic elastomer composition include those made of a matrix containing a thermoplastic resin and a domain containing a rubber.

Examples of the thermoplastic resin include a polyamide resin, a polyester resin, an ethylene-vinyl alcohol resin, a polyolefin resin, a polyketone resin, a polyacetal resin, a polyphenylene sulfide resin, a polyphenylene ether resin, and a fluororesin, and examples of the rubber include butyl rubber, modified butyl rubber, an olefin-based thermoplastic elastomer, a styrene-based thermoplastic elastomer, an ethylene-unsaturated carboxylic acid ester copolymer, a polyamide elastomer, a polyester elastomer, and a polyurethane elastomer.

The thickness of the outer layer is preferably from 0.2 to 5.0 mm, more preferably from 0.2 to 4.0 mm, and still more preferably from 0.2 to 3.0 mm.

Although the method for producing the hose for fluid transportation is not limited, the hose for fluid transportation can be produced by the method exemplified below.

The thermoplastic resin composition for the (A) layer and the thermoplastic resin or the thermoplastic resin composition for the (B) layer are placed on a mandrel coated with a release agent in advance. An extruder extrudes these materials into a tube shape with the thermoplastic resin composition for the (A) layer becoming the innermost layer, resulting in the (A) layer and the (B) layer. Next, the extruder extrudes the rubber composition for the (C) layer onto the (B) layer and into a tube shape, resulting in the (C) layer. Next, an adhesive is applied onto the (C) layer, and a braiding machine braids steel wires or organic fibers to form a reinforcing layer. Next, the extruder extrudes the rubber composition for the outer layer onto the reinforcing layer and into a tube shape to form an outer layer. Steam vulcanization is then carried out, after which the mandrel is removed, resulting in a hose.

Examples

Raw Materials

The raw materials used in the following examples and comparative examples are as follows.

Thermoplastic Resin

PA6: Polyamide 6, "UBE Nylon" (trade name) 1011FB, available from Ube Industries, Ltd.

PA610: Polyamide 610, "Diamide" (trade name) HS16, available from Daicel-Evonik Co., Ltd.

PA6/12: Polyamide 6/12 copolymer, "UBE Nylon" (trade name) 7024B, available from Ube Industries, Ltd.

PA6/66: Polyamide 6/66 copolymer, "UBE Nylon" 5033B, available from Ube Industries, Ltd.

PA66: Polyamide 66, "Amilan" (trade name) CM3001-N available from Toray Industries, Inc.

PA1010: Polyamide 1010, "Diamide" (trade name) DS16, available from Daicel-Evonik Ltd.

PA11-1: Polyamide 11, "RILSAN" (trade name) BESN P40TL, with plasticizer (type of plasticizer: N-butylbenzenesulfonamide, plasticizer content: 12 mass %), available from Arkema K.K.

PA11-2: Polyamide 11, "RILSAN" (trade name) BESN OTL, no plasticizer, available from Arkema K.K.

PA12: Polyamide 12, "UBESTA" (trade name) 3012U, available from Ube Industries, Ltd.

MXD6: Polyamide MXD6, "Reny" (trade name) S6001, available from Mitsubishi Gas Chemical Co., Ltd.

EVOH: Ethylene-vinyl alcohol copolymer, "EVAL" (trade name) FP201B, available from Kuraray Co., Ltd.

Rubber

Acid-modified PO: Maleic acid anhydride-modified ethylene-1-butene copolymer, "TAFMER" (trade name) MH7010, available from Mitsui Chemicals, Inc.

Br-IPMS: Brominated isobutylene-p-methylstyrene copolymer, "EXXPRO" (trade name) 3745, available from ExxonMobile Chemical Co.

NBR: Acrylonitrile-butadiene rubber, "NIPOL" (trade name) 1043, available from ZEON CORPORATION NBR-PVC: Nitrile rubber/polyvinyl chloride blend, "NIPOL" (trade name) DN517, available from ZEON CORPORATION CSM: Chlorosulfonated polyethylene rubber, "Hypalon" (trade name) 40S, available from DuPont Others ε-Caprolactam: Available from Fujifilm Wako Pure Chemical Corporation Carbon black: "SEAST" (trade name) V, available from Tokai Carbon Co., Ltd.

Sulfur: Oil treated sulfur, available from Hosoi Chemical Industry Co., Ltd.

Vulcanization accelerator: Di-2-benzothiazolyl disulfide "NOCCELER" (trade name) DM, available from Ouchi Shinko Chemical Industrial Co., Ltd.

Anti-aging agent: 2,2,4-trimethyl-1,2-dihydroquinoline polymer, "NOCRAC" (trade name) 224, available from Ouchi Shinko Chemical Industrial Co., Ltd.

Zinc oxide: Zinc oxide III, available from Seido Chemical Industry Co., Ltd.

Stearic acid: Stearic acid, Cica Grade 1, available from Kanto Chemical Co., Ltd.

Plasticizer: Diisononyl phthalate, available from Taoka Chemical Co., Ltd.

(1) Preparation of Thermoplastic Resin Composition

Raw materials in a compounding ratio presented in Table 1 were fed into a twin screw kneader (available from The Japan Steel Works, Ltd.) and kneaded at from 200 to 240° C. for 3 minutes. The resulting kneaded product was extruded into a strand, cooled in water, and then cut with a strand cutter, resulting in a thermoplastic resin composition as pellets.

(2) Preparation of Rubber Composition

Raw materials in a compounding ratio presented in Table 2 were kneaded using a Banbury mixer, resulting in a rubber composition.

(3) Preparation of Rubber Composition for Outer Layer

Raw materials in the compounding ratio presented in Table 3 were kneaded using a Banbury mixer, resulting in a rubber composition for an outer layer.

(4) Production of Hose

A material for the (A) layer and a material for the (B) layer presented in Tables 4 to 6 were placed on a mandrel coated with a release agent in advance. An extruder extruded these materials into a tube shape having a thickness presented in Tables 4 to 6 using with the (A) layer becoming the innermost layer, resulting in the (A) layer and the (B) layer. On the (B) layer, a material for the (C) layer presented in Tables 4 to 6 was extruded to give a thickness presented in Tables 4 to 6, resulting in the (C) layer. On the (C) layer, a phenol-based adhesive was applied, and a braiding machine braided steel wires, resulting in a reinforcing layer. The rubber composition for an outer layer presented in Table 3 was extruded onto the reinforcing layer to give a thickness of 2.0 mm, resulting in an outer layer. Thereafter, steam vulcanization was performed at 143° C. for 60 minutes, and the mandrel was removed, resulting in a hose.

For each Example and each Comparative Example, the 10% modulus M10 (AB) and the 100% modulus M100 (AB) of the multilayer structure containing the (A) layer and the (B) layer, the 100% modulus M100 (A) of the (A) layer, the 100% modulus M100 (B) of the (B) layer, the 100% modulus M100 (C) of the (C) layer, fuel transmission of the (B) layer, suppression of kinking, bending force of hose, and handling properties at room temperature were evaluated. The evaluation results are presented in Tables 4 to 6.

Note that, the measurement and evaluation methods for each evaluation item are as follows.

Measurement of Modulus

The moduli of a thermoplastic resin, thermoplastic resin composition, or multilayer structure were determined as follows. A sheet of thermoplastic resin, a sheet of thermoplastic resin composition, or a multilayer structure was punched into a JIS No. 3 dumbbell shape, and a tensile test was conducted at 25° C. and a tensile speed of 100 mm/min, resulting in a stress strain curve. From the resulting stress strain curve, the stress at 10% elongation was taken as the 10% modulus M10 [MPa], and the stress at 100% elongation was taken as the 100% modulus M100 [MPa].

The modulus of a rubber was determined in accordance with JIS K 6251 as follows. A vulcanized rubber sheet was punched into a JIS No. 3 dumbbell shape, and a tensile test was conducted at 25° C. and a tensile speed of 500 mm/min, resulting in a stress strain curve. From the resulting stress strain curve, the stress at 10% elongation was taken as the 10% modulus M10 [MPa], and the stress at 100% elongation was taken as the 100% modulus M100 [MPa].

The sheet of thermoplastic resin or the sheet of thermoplastic resin composition was produced by extruding a thermoplastic resin or a thermoplastic resin composition into a sheet having an average thickness of 0.15 mm using a single screw extruder. The single screw extruder used was a Φ40 mm single screw extruder (available from PLA GIKEN Co., Ltd.) equipped with a 550 mm-wide T-shaped die, with the temperature of the cylinder and die set to from 220 to 245° C. and the take-up speed set to from 0.5 to 3.0 mm/min.

The vulcanized rubber sheet was prepared by cutting a rubber composition prepared in the Banbury mixer into a predetermined size, sandwiching the cut rubber composition between iron plates using a mold having a thickness of 2 mm and lengths of 150 mm×150 mm, and vulcanizing the rubber composition at a temperature of 143° C. and a pressure of 3.0 MPa for 60 minutes using a press machine.

The multilayer structure containing the (A) layer and the (B) layer was prepared by cutting out two 150 mm×150 mm squares, one from a sheet of a material for the (A) layer and the other from a sheet of a material for the (B) layer, and hot-pressing the squares at 3.0 MPa for 5 minutes using a press machine set to a temperature that is "10° C.+the melting point of either the material for the (A) layer or the material for the (B) layer, whichever is higher".

In Comparative Example 3, an adhesive layer was provided between the (A) layer and the (B) layer, followed by vulcanizing for 60 minutes at a temperature of 143° C. and a pressure of 3.0 MPa using a press machine.

Measurement of Fuel Transmission Twenty mL of a test fuel CE10 (isooctane/toluene/ethanol=45/45/10 vol %) was enclosed in an aluminum cup used in JIS Z 0208 "Testing Methods for Determination of the Water Vapour Transmission Rate of Moisture-Proof Packaging Materials". Then, a sheet of a material for the (B) layer prepared in Measurement of Modulus above was cut into a circle having a transmission surface with a diameter of 60 mm, and attached to the aluminum cup. The cup was allowed to stand in an atmosphere of 23° C. with the sheet surface facing downward so that the sheet and the test fuel were always in contact with each other, and the weight of the cup was measured every day. The fuel transmission was calculated from the weight loss at the 7th day.

Suppression of Kinks

In accordance with JIS K 6330-9, the hoses were subjected to a bending test under the condition of 23° C. When the hoses were fixed at one end and bent at the other end, "◯" was given to those that did not kink at a bending radius R=100 mm, and "X" was given to those that kinked at that bending radius.

Handling Properties at Normal Temperature

In accordance with JIS K 6330-9, the hoses were subjected to a bending test under the condition of 23° C. When the hoses were fixed at one end and bent at the other end, the bending force at a bending radius R=130 mm was measured. The hose bending force of each Example and each Comparative Example was expressed as an index with the hose bending force of Comparative Example 1 being 100. The handling properties at room temperature were evaluated as "poor" when the index of the hose bending force was 100 or more, as "good" when it was 90 or more and less than 100, and as "excellent" when it was less than 90.

TABLE 1

| | | Compounding Proportion of Thermoplastic Resin Composition | | | | | | | | |
|---|---|---|---|---|---|---|---|---|---|---|
| | | PA alloy 1 | PA alloy 2 | PA alloy 3 | PA alloy 4 | PA alloy 5 | PA alloy 6 | PA alloy 7 | EVOH alloy 1 | EVOH alloy 2 |
| PA6 | Parts by mass | 62 | 62 | 30 | 67 | | 24.5 | 78 | | |
| PA6/12 | Parts by mass | | | | | | 10.5 | | | |
| PA11-1 | Parts by mass | 5 | | 2.5 | | | | 5 | | |
| PA11-2 | Parts by mass | 15 | 20 | 7.5 | | | | 15 | | |
| PA12 | Parts by mass | | | | | 30 | | | | |
| EVOH | Parts by mass | | | | | | | | 45 | 35 |
| Acid-modified PO | Parts by mass | 18 | 18 | 60 | 30 | | | 2 | 55 | 65 |
| Br-IPMS | Parts by mass | | | | | 70 | 65 | | | |
| ε-Caprolactam | Parts by mass | | | | 3 | | | | | |
| Total | Parts by mass | 100 | 100 | 100 | 100 | 100 | 100 | 100 | 100 | 100 |

TABLE 2

| Compounding Proportion of Rubber Composition | | | | | |
|---|---|---|---|---|---|
| | | | NBR1 | NBR2 | NBR3 |
| NBR | Parts by mass | | 100 | 100 | 100 |
| Carbon black | Parts by mass | | 50 | 70 | 30 |
| Sulfur | Parts by mass | | 1.5 | 1.5 | 1.5 |
| Vulcanization accelerator | Parts by mass | | 1.0 | 1.0 | 1.0 |
| Anti-aging agent | Parts by mass | | 1.0 | 1.0 | 1.0 |
| Zinc oxide | Parts by mass | | 5.0 | 5.0 | 5.0 |
| Stearic acid | Parts by mass | | 2.0 | 2.0 | 2.0 |
| Plasticizer | Parts by mass | | 6.0 | 6.0 | 8.0 |
| Total | Parts by mass | | 166.5 | 186.5 | 148.5 |

TABLE 3

| Compounding Proportion of Rubber Composition for Outer Layer | |
|---|---|
| | Compounding ratio |
| NBR-PVC | 80 Parts by mass |
| CSM | 20 Parts by mass |
| Carbon black | 60 Parts by mass |
| Total | 160 Parts by mass |

TABLE 4-1

| | Comparative Example 1 | Comparative Example 2 | Comparative Example 3 | Example 1 | Example 2 |
|---|---|---|---|---|---|
| Material for (A) layer | PA alloy 1 | PA alloy 1 | NBR1 | PA alloy 1 | PA alloy 2 |
| Material for (B) layer | EVOH | EVOH | EVOH | EVOH | EVOH |

TABLE 4-1-continued

|  |  | Comparative Example 1 | Comparative Example 2 | Comparative Example 3 | Example 1 | Example 2 |
|---|---|---|---|---|---|---|
| Material for (C) layer | | — | PA alloy 1 | NBR1 | NBR1 | NBR1 |
| Content of plasticizer in A) layer | Mass % | 0.6 | 0.6 | 0 | 0.6 | 0 |
| Thickness T (A) of (A) layer | mm | 0.15 | 0.45 | 1.50 | 0.15 | 0.15 |
| Thickness T (B) of (B) layer | mm | 0.15 | 0.15 | 0.40 | 0.15 | 0.15 |
| Thickness T (C) of (C) layer | mm | — | 0.40 | 0.50 | 2.65 | 2.65 |
| T (AB)/T (C) | | — | 1.5 | 3.8 | 0.11 | 0.11 |
| T (A)/T (B) | | 1.0 | 3.0 | 3.8 | 1.0 | 1.0 |
| M10 (AB) | MPa | 33.6 | 33.6 | 27.4 | 33.6 | 35 |
| M100 (AB) | MPa | 34.1 | 34.1 | 28.4 | 34.1 | 33 |
| M10 (AB)/M100 (AB) | | 0.99 | 0.99 | 0.96 | 0.99 | 1.06 |
| M100 (A) | MPa | 16.6 | 16.6 | 13.1 | 16.6 | 18.0 |
| M100 (B) | MPa | 43.6 | 43.6 | 43.6 | 43.6 | 43.6 |
| M100 (C) | MPa | — | 16.6 | 13.1 | 13.1 | 13.1 |
| Fuel transmission of (B) layer | *1 | 0.4 | 0.4 | 0.4 | 0.4 | 0.4 |
| Suppression of kinks | | × | × | × | ○ | ○ |
| Bending force of hose | | 100 | 102 | 190 | 88 | 98 |
| Handling properties at normal temperature | | — | Poor | Poor | Excellent | Good |

*1) mm · mg/24 h · cm$^2$

TABLE 4-2

|  |  | Example 3 | Example 4 | Example 5 | Comparative Example 4 | Example 6 |
|---|---|---|---|---|---|---|
| Material for (A) layer | | PA alloy 1 | PA alloy 1 | PA alloy 1 | PA alloy 3 | PA alloy 1 |
| Material for (B) layer | | EVOH | EVOH | EVOH | EVOH | EVOH |
| Material for (C) layer | | NBR1 | NBR1 | NBR1 | NBR2 | NBR1 |
| Content of plasticizer in (A) layer | Mass % | 0.6 | 0.6 | 0.6 | 0.3 | 0.6 |
| Thickness T (A) of (A) layer | mm | 0.15 | 0.01 | 0.15 | 0.15 | 0.25 |
| Thickness T (B) of (B) layer | mm | 0.15 | 0.01 | 0.30 | 0.15 | 0.50 |
| Thickness T (C) of (C) layer | mm | 0.15 | 2.00 | 2.65 | 2.65 | 2.65 |
| T (AB)/T (C) | | 2.0 | 0.01 | 0.17 | 0.11 | 0.28 |
| T (A)/T (B) | | 1.0 | 1.0 | 0.50 | 1.0 | 0.50 |
| M10 (AB) | MPa | 33.6 | 33.6 | 33.6 | 30 | 33.6 |
| M100 (AB) | MPa | 34.1 | 34.1 | 34.1 | 31 | 34.1 |
| M10 (AB)/M100 (AB) | | 1.19 | 1.14 | 1.11 | 0.97 | 0.99 |
| M100 (A) | MPa | 16.6 | 16.6 | 16.6 | 10.0 | 16.6 |
| M100 (B) | MPa | 43.6 | 43.6 | 43.6 | 43.6 | 43.6 |
| M100 (C) | MPa | 13.1 | 13.1 | 13.1 | 17.0 | 13.1 |
| Fuel transmission of (B) layer | *1 | 0.4 | 0.4 | 0.4 | 0.4 | 0.4 |
| Suppression of kinks | | ○ | ○ | ○ | ○ | ○ |
| Bending force of hose | | 92 | 92 | 98 | 102 | 99 |
| Handling properties at normal temperature | | Good | Good | Good | Poor | Good |

*1) mm · mg/24 h · cm$^2$

TABLE 5

|  |  | Example 7 | Example 8 | Example 9 | Example 10 | Example 11 | Example 12 | Example 13 | Example 14 | Example 15 |
|---|---|---|---|---|---|---|---|---|---|---|
| Material for (A) layer | | PA alloy 1 | PA alloy 1 | PA alloy 1 | PA alloy 1 | PA alloy 1 | PA alloy 1 | PA alloy 1 | PA alloy 1 | PA alloy 1 |
| Material for (B) layer | | EVOH | PA6 | PA6/66 | PA66 | PA610 | PA6/12 | PA1010 | PA11 | PA12 |
| Material for (C) layer | | NBR1 | NBR1 | NBR1 | NBR1 | NBR1 | NBR1 | NBR1 | NBR1 | NBR1 |
| Content of plasticizer in (A) layer | Mass % | 0.6 | 0.6 | 0.6 | 0.6 | 0.6 | 0.6 | 0.6 | 0.6 | 0.6 |
| Thickness T (A) of (A) layer | mm | 0.15 | 0.15 | 0.15 | 0.15 | 0.15 | 0.15 | 0.15 | 0.15 | 0.15 |
| Thickness T (B) of (B) layer | mm | 0.01 | 0.15 | 0.15 | 0.15 | 0.15 | 0.15 | 0.15 | 0.15 | 0.15 |
| Thickness T (C) of (C) layer | mm | 2.65 | 2.65 | 2.65 | 2.65 | 2.65 | 2.65 | 2.65 | 2.65 | 2.65 |
| T (AB)/T (C) | | 0.06 | 0.11 | 0.11 | 0.11 | 0.11 | 0.11 | 0.11 | 0.1 | 0.11 |
| T (A)/T (B) | | 15 | 1.0 | 1.0 | 1.0 | 1.0 | 1.0 | 1.0 | 1.0 | 1.0 |
| M10 (AB) | MPa | 33.6 | 25 | 25 | 25 | 26 | 26 | 26 | 26 | 26 |
| M100 (AB) | MPa | 34.1 | 26 | 26 | 26 | 27 | 27 | 27 | 27 | 27 |
| M10 (AB)/M100 (AB) | | 0.99 | 0.96 | 0.96 | 0.96 | 0.96 | 0.96 | 0.96 | 0.96 | 0.96 |
| M100 (A) | MPa | 16.6 | 16.6 | 16.6 | 16.6 | 16.6 | 16.6 | 16.6 | 16.6 | 16.6 |
| M100 (B) | MPa | 43.6 | 24.3 | 23.0 | 23.0 | 23.8 | 23.6 | 27.4 | 30.5 | 25.2 |
| M100 (C) | MPa | 13.1 | 13.1 | 13.1 | 13.1 | 13.1 | 13.1 | 13.1 | 13.1 | 13.1 |
| Fuel transmission of (B) layer | *1 | 0.4 | 0.3 | 0.7 | 0.5 | 0.8 | 0.8 | 0.9 | 1.0 | 1.0 |
| Suppression of kinks | | ○ | ○ | ○ | ○ | ○ | ○ | ○ | ○ | ○ |
| Bending force of hose | | 88 | 92 | 92 | 92 | 93 | 93 | 93 | 93 | 93 |
| Handling properties at normal temperature | | Excellent | Good | Good | Good | Good | Good | Good | Good | Good |

*1) mm · mg/24 h · cm²

TABLE 6-1

|  |  | Comparative Example 5 | Example 16 | Example 17 | Example 18 | Example 19 |
|---|---|---|---|---|---|---|
| Material for (A) layer | | PA alloy 1 | PA alloy 1 | PA alloy 4 | PA alloy 5 | PA alloy 6 |
| Material for (B) layer | | MXD6 | EVOH alloy 1 | EVOH | EVOH | EVOH |
| Material for (C) layer | | NBR1 | NBR1 | NBR1 | NBR3 | NBR3 |
| Content of plasticizer in (A) layer | Mass % | 0.6 | 0.6 | 3.0 | 0 | 0 |
| Thickness T (A) of (A) layer | mm | 0.15 | 0.15 | 0.15 | 0.15 | 0.15 |
| Thickness T (B) of (B) layer | mm | 0.15 | 0.15 | 0.15 | 0.15 | 0.15 |
| Thickness T (C) of (C) layer | mm | 2.65 | 2.65 | 2.65 | 2.65 | 2.65 |
| T (AB)/T (C) | | 0.11 | 0.11 | 0.11 | 0.11 | 0.11 |
| T (A)/T (B) | | 1.0 | 1.0 | 1.0 | 1.0 | 1.0 |
| M10 (AB) | MPa | 60 | 15.3 | 27.8 | 20 | 20 |
| M100 (AB) | MPa | 48 | 16.9 | 28.6 | 21 | 21 |
| M10 (AB)/M100 (AB) | | 1.25 | 0.91 | 0.97 | 0.95 | 0.95 |
| M100 (A) | MPa | 16.6 | 16.6 | 14.2 | 8.8 | 6.0 |
| M100 (B) | MPa | 70 | 17.2 | 43.6 | 43.6 | 43.6 |
| M100 (C) | MPa | 13.1 | 13.1 | 13.1 | 5.0 | 5.0 |
| Fuel transmission of (B) layer | *1 | 0.5 | 10.0 | 0.4 | 0.4 | 0.4 |
| Suppression of kinks | | ○ | ○ | ○ | ○ | ○ |
| Bending force of hose | | 127 | 90 | 94 | 93 | 93 |
| Handling properties at normal temperature | | Poor | Good | Good | Good | Good |

*1) mm · mg/24 h · cm²

TABLE 6-2

|  | Example 20 | Comparative Example 6 | Comparative Example 7 | Comparative Example 8 |
|---|---|---|---|---|
| Material for (A) layer | EVOH alloy 2 | PA alloy 7 | PA6 | PA11-2 |
| Material for (B) layer | EVOH | EVOH | EVOH | EVOH |
| Material for (C) layer | NBR3 | NBR1 | NBR1 | NBR1 |

TABLE 6-2-continued

|  |  | Example 20 | Comparative Example 6 | Comparative Example 7 | Comparative Example 8 |
|---|---|---|---|---|---|
| Content of plasticizer in (A) layer | Mass % | 0 | 0.6 | 0 | 0 |
| Thickness T (A) of (A) layer | mm | 0.15 | 0.15 | 0.15 | 0.15 |
| Thickness T (B) of (B) layer | mm | 0.15 | 0.15 | 0.15 | 0.15 |
| Thickness T (C) of (C) layer | mm | 2.65 | 2.65 | 2.65 | 2.65 |
| T (AB)/T (C) |  | 0.11 | 0.11 | 0.11 | 0.11 |
| T (A)/T (B) |  | 1.0 | 1.0 | 1.0 | 1.0 |
| M10 (AB) | MPa | 22 | 40.3 | 42 | 45 |
| M100 (AB) | MPa | 23 | 33 | 34 | 37.1 |
| M10 (AB)/M100 (AB) |  | 0.96 | 1.22 | 1.23 | 1.21 |
| M100 (A) | MPa | 10.3 | 28.5 | 24.3 | 30.5 |
| M100 (B) | MPa | 43.6 | 43.6 | 43.6 | 43.6 |
| M100 (C) | MPa | 5.0 | 13.1 | 13.1 | 13.1 |
| Fuel transmission of (B) layer | *1 | 0.4 | 0.4 | 0.4 | 0.4 |
| Suppression of kinks |  | ○ | X | ○ | ○ |
| Bending force of hose |  | 93 | 124 | 124 | 122 |
| Handling properties at normal temperature |  | Good | Poor | Poor | Poor |

*1) mm · mg/24 h · cm$^2$

INDUSTRIAL APPLICABILITY

The hose for fluid transportation according to an embodiment of the present technology can be suitably used as a hose for transporting fluids such as gasoline and fuel.

The invention claimed is:

1. A hose for fluid transportation, comprising:
an inner layer;
a reinforcing layer; and
an outer layer,
the inner layer comprising a (A) layer comprising a thermoplastic resin composition ax, the thermoplastic resin composition ax being made of a matrix am comprising a thermoplastic resin ar and a domain ad comprising a rubber ae, a (B) layer comprising a thermoplastic resin b or a thermoplastic resin composition bx, the thermoplastic resin composition bx being made of a matrix bm comprising a thermoplastic resin br and a domain bd comprising a rubber be, and a (C) layer comprising a rubber composition cx,
the (A) layer being an innermost layer, the (B) layer being arranged on an outer side of the (A) layer, and the (C) layer being arranged on an outer side of the (B) layer,
a ratio M10 (AB)/M100 (AB) of a 10% modulus M10 (AB) to a 100% modulus M100 (AB) of a multilayer structure comprising the (A) layer and the (B) layer being more than 0.5 and less than 1.2, and
a 100% modulus M100 (A) of the (A) layer, a 100% modulus M100 (B) of the (B) layer, and a 100% modulus M100 (C) of the (C) layer satisfying the relationship formula M100 (C)<M100 (A)<M100 (B).

2. The hose for fluid transportation according to claim 1, wherein the (A) layer and the (B) layer are directly bonded to each other or bonded to each other via an adhesive layer.

3. The hose for fluid transportation according to claim 2, wherein a ratio T (AB)/T (C) of a total thickness T (AB) of the (A) layer and the (B) layer to a thickness T (C) of the (C) layer is from 0.01 to 2.0.

4. The hose for fluid transportation according to claim 3, wherein a ratio T (A)/T (B) of a thickness T (A) of the (A) layer and a thickness T (B) of the (B) layer is more than 0.1 and less than 20, and the thickness T (B) of the (B) layer is from 0.01 to 0.5 mm.

5. The hose for fluid transportation according to claim 4, wherein the thermoplastic resin composition ax comprises from 5 to 70 mass % of the domain ad.

6. The hose for fluid transportation according to claim 5, wherein the thermoplastic resin composition ax comprises 0.1 mass % or more of a compound having plasticizing action.

7. The hose for fluid transportation according to claim 6, wherein the thermoplastic resin b or the thermoplastic resin br comprises at least one selected from the group consisting of an ethylene-vinyl alcohol copolymer, polyamide 6, a polyamide 6/66 copolymer, polyamide 66, polyamide 610, a polyamide 6/12 copolymer, polyamide 1010, polyamide 11, and polyamide 12.

8. The hose for fluid transportation according to claim 7, wherein 50 mass % or more of rubber in the rubber composition cx is at least one selected from the group consisting of acrylonitrile-butadiene rubber, acrylic rubber, and fluororubber.

9. The hose for fluid transportation according to claim 8, wherein a fuel transmission of the (B) layer at 23° C. is 2.0 mm mg/24 h·cm$^2$ or less.

10. The hose for fluid transportation according to claim 9, wherein the fluid is gasoline, alcohol-mixed gasoline, kerosene, light oil, heavy oil, vegetable oil, an organic solvent, or a mixture of the foregoing.

11. The hose for fluid transportation according to claim 1, wherein a ratio T (AB)/T (C) of a total thickness T (AB) of the (A) layer and the (B) layer to a thickness T (C) of the (C) layer is from 0.01 to 2.0.

12. The hose for fluid transportation according to claim 1, wherein a ratio T (A)/T (B) of a thickness T (A) of the (A) layer and a thickness T (B) of the (B) layer is more than 0.1 and less than 20, and the thickness T (B) of the (B) layer is from 0.01 to 0.5 mm.

13. The hose for fluid transportation according to claim 1, wherein the thermoplastic resin composition ax comprises from 5 to 70 mass % of the domain ad.

14. The hose for fluid transportation according to claim 1, wherein the thermoplastic resin composition ax comprises 0.1 mass % or more of a compound having plasticizing action.

15. The hose for fluid transportation according to claim 1, wherein the thermoplastic resin b or the thermoplastic resin br comprises at least one selected from the group consisting of an ethylene-vinyl alcohol copolymer, polyamide 6, a polyamide 6/66 copolymer, polyamide 66, polyamide 610, a polyamide 6/12 copolymer, polyamide 1010, polyamide 11, and polyamide 12.

16. The hose for fluid transportation according to claim 1, wherein 50 mass % or more of rubber in the rubber composition cx is at least one selected from the group consisting of acrylonitrile-butadiene rubber, acrylic rubber, and fluororubber.

17. The hose for fluid transportation according to claim 1, wherein a fuel transmission of the (B) layer at 23° C. is 2.0 mm mg/24 h·cm$^2$ or less.

18. The hose for fluid transportation according to claim 1, wherein the fluid is gasoline, alcohol-mixed gasoline, kerosene, light oil, heavy oil, vegetable oil, an organic solvent, or a mixture of the foregoing.

* * * * *